(12) United States Patent
Mohtadi et al.

(10) Patent No.: US 9,142,834 B2
(45) Date of Patent: Sep. 22, 2015

(54) MAGNESIUM ION BATTERIES AND MAGNESIUM ELECTRODES EMPLOYING MAGNESIUM NANOPARTICLES SYNTHESIZED VIA A NOVEL REAGENT

(71) Applicant: Toyota Motor Engineering & Manufacturing North America, Inc., Erlanger, KY (US)

(72) Inventors: Rana Mohtadi, Northville, MI (US); Michael Paul Rowe, Pinckeny, MI (US); Ryan Daniel Desautels, Winnipeg (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/328,647

(22) Filed: Jul. 10, 2014

(65) Prior Publication Data

US 2015/0099135 A1 Apr. 9, 2015

Related U.S. Application Data

(63) Continuation-in-part of application No. 14/046,081, filed on Oct. 4, 2013, now Pat. No. 8,980,219, and a continuation-in-part of application No. 14/046,120, filed on Oct. 4, 2013, and a continuation-in-part of application No. 14/219,836, filed on Mar. 19, 2014, and a continuation-in-part of application No. 14/269,895, filed on May 5, 2014.

(51) Int. Cl.
*H01M 4/04* (2006.01)
*H01M 4/38* (2006.01)
(Continued)

(52) U.S. Cl.
CPC ............... *H01M 4/381* (2013.01); *C01B 6/02* (2013.01); *C01B 6/06* (2013.01); *C22C 23/00* (2013.01); *H01M 10/054* (2013.01)

(58) Field of Classification Search
CPC .......... C01B 6/003; C01B 6/006; C01B 6/06; C01B 3/0026; C01B 3/0031; H01M 4/04; H01M 8/00; H01M 8/10
See application file for complete search history.

(56) References Cited

U.S. PATENT DOCUMENTS 7,041,350 B1    5/2006 Rule et al.
7,927,507 B1 *  4/2011 Li et al. .................... 252/182.33
(Continued)

FOREIGN PATENT DOCUMENTS

WO    2012007830 A1    1/2012
WO    2013063161 A2    5/2013

OTHER PUBLICATIONS

Rowe et al., "Synthesis of Metal Nanoparticles", co-pending U.S. Appl. No. 14/046,120, filed Oct. 4, 2013.
(Continued)

*Primary Examiner* — Stanley Silverman
*Assistant Examiner* — Syed Iqbal
(74) *Attorney, Agent, or Firm* — Christopher G. Darrow; Darrow Mustafa PC

(57) ABSTRACT

Electrodes employing as active material magnesium nanoparticles synthesized by a novel route are provided. The nanoparticle synthesis is facile and reproducible, and provides magnesium nanoparticles of very small dimension and high purity for a wide range of metals. The electrodes utilizing these nanoparticles thus may have superior capability. Magnesium ion electrochemical cells employing said electrodes are also provided.

12 Claims, 1 Drawing Sheet

(51) Int. Cl.
*C22C 23/00* (2006.01)
*C01B 6/02* (2006.01)
*C01B 6/06* (2006.01)
*H01M 10/054* (2010.01)

(56) References Cited

U.S. PATENT DOCUMENTS

2005/0217427 A1    10/2005    Suthersan et al.
2009/0011297 A1*   1/2009     Jang et al. ................... 429/19
2009/0264277 A1    10/2009    Raj et al.
2010/0021799 A1*   1/2010     Rieke .......................... 429/50

OTHER PUBLICATIONS

Singh et al, "Electrodes and Electrochemical Cells Emplying Metal Nanoparticles Synthesized Via a Novel Reagent", co-pending U.S. Appl. No. 14/219,836, filed Mar. 19, 2014.

Singh et al., "Metal Nanoparticles Synthesized Via a Novel Reagent and Application to Electrochemical Devices", co-pending U.S. Appl. No. 14/219,831, filed Mar. 19, 2014.

Mizuno et al, "Metal-Air Batteries and Electrodes Therefor Utilizing Metal Nanoparticle Synthesized Via a Novel Mechanicochemical Route" co-pending U.S. Appl. No. 14/307,017, filed Jun. 17, 2014.

McDonald et al, "Electrodes Containing Iridium Nanoparticles for the Electrolytic Production of Oxygen From Water", co-pending U.S. Appl. No. 14/328,635, filed Jul. 10, 2014.

Imamura et al., "Dehydriding of Sn/MgH2 nanocomposite formed by ball milling of MgH2 with Sn", Int. J. Hydrogen Energy, 32, 4191-4194, 2007.

Valvo et al, "Electrospraying-assisted synthesis of tin nanoparticles for Li-ion battery electrodes", J. Power Sources, 189, 297-302, 2009.

Zou et al, "Size-dependent melting properties of Sn nanoparticles by chemical reduction synthesis", Trans. Nonferrous Met. Soc. China, 20, 248-253, 2009.

* cited by examiner

MAGNESIUM ION BATTERIES AND MAGNESIUM ELECTRODES EMPLOYING MAGNESIUM NANOPARTICLES SYNTHESIZED VIA A NOVEL REAGENT

CROSS-REFERENCE TO RELATED APPLICATIONS

This application is a continuation-in-part of application Ser. No. 14/046,081, filed Oct. 4, 2013; a continuation-in-part of application Ser. No. 14/046,120, filed Oct. 4, 2013; a continuation-in-part of application Ser. No. 14/219,836, filed Mar. 19, 2014; and a continuation-in-part of application Ser. No. 14/269,895, filed May 5, 2014; each of which is herein incorporated by reference in its entirety.

TECHNICAL FIELD

The present invention relates in general to an electrode having magnesium nanoparticles synthesized by a novel route, and to an electrochemical cell bearing such an electrode.

BACKGROUND

Lithium battery systems have, for several years, represented an important, and commercially successful, energy storage and deployment medium. Magnesium battery systems have recently been under development, as potentially superior alternatives to lithium battery systems, due among other reasons to the inherently superior capacity of magnesium electrochemistry.

The development of optimal magnesium batteries carries certain challenges, however, such as the generally slow diffusion rates of Mg ions at the electrolyte interface with some typically employed electrodes. Prospects for producing competitive or superior magnesium batteries can potentially be increased by the incorporation of electrodes which utilize nanoparticulate metal as an electrochemically active material. To maximize the prospects for technological success and economic viability, it is desirable that such metal nanoparticles be obtainable through processes that are simple, easily scalable to industrial capacity, highly reproducible, and capable of producing metal nanoparticles of high purity (e.g. devoid of oxides and other undesirable contaminating species.

SUMMARY

Electrodes and electrochemical cell employing metal nanoparticles synthesized by a novel route are provided.

In one aspect, an electrode comprising magnesium nanoparticles is disclosed, wherein the magnesium nanoparticles are synthesized by a method comprising adding surfactant to a reagent complex according to Formula I:

$$Mg^0.Xy \qquad \qquad I,$$

wherein $Mg^0$ is zero-valent magnesium, X is a hydride, and y is an integral or fractional value greater than zero.

In another aspect, an electrochemical cell is disclosed. The electrochemical cell has an electrode, the electrode comprising magnesium nanoparticles, the magnesium nanoparticles having been synthesized by a method comprising adding surfactant to a reagent complex according to Formula I:

$$Mg^0.Xy \qquad \qquad I,$$

wherein $Mg^0$ is zero-valent magnesium, X is a hydride, and y is an integral or fractional value greater than zero.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

The present disclosure describes magnesium nanoparticles which are of high purity, oxide-free, and are prepared by a novel synthetic route. The disclosure further describes electrodes which have the magnesium nanoparticles as active material. The disclosure also describes electrochemical cells having such electrodes. The disclosure further discloses methods for preparing all of the above.

Currently, no simple, high yield procedure exists for making magnesium nanoparticles. Additionally, electrodes containing magnesium nanoparticles are not known.

A reagent complex for the synthesis of metallic magnesium nanoparticles has the formula indicated as Formula I:

$$Mg^0.X_y \qquad \qquad I,$$

wherein $Mg^0$ is zero-valent magnesium metal and X is a hydride. The subscript y can be any positive fractional or integral value. In some cases, y can be a value from 1 to 4, inclusive. In some cases, y can be a value from 1 to 2, inclusive. In some cases, y will be approximate 2.

The hydride employed in Formula I can be a solid metal hydride (e.g. NaH, or $MgH_2$), metalloid hydride (e.g. $BH_3$), complex metal hydride (e.g. $LiAlH_4$), or salt metalloid hydride also referred to as a salt hydride (e.g. $LiBH_4$). In some examples the hydride will be $LiBH_4$, yielding a reagent complex having the formula Mg.$LiBH_4$. In some specific examples, the reagent complex will have the formula Mg.$(LiBH_4)_2$. It is to be appreciated that the term hydride as used herein can also encompass a corresponding deuteride or tritide.

The reagent complex can be a complex of individual molecular entities, such as a single metal atom in oxidation state zero in complex with one or more hydride molecules. Alternatively the complex described by Formula I can exist as a molecular cluster, such as a cluster of metal atoms in oxidation state zero interspersed with hydride molecules, or a cluster of metal atoms in oxidation state zero, the cluster surface-coated with hydride molecules or the salt hydride interspersed throughout the cluster.

One process by which a reagent complex according to Formula I can be obtained includes a step of ball-milling a mixture which includes both a hydride and a preparation composed of magnesium. The preparation composed of magnesium can be any source of metallic magnesium, but will typically be a source of metallic magnesium which contains zero-valent magnesium at greater than 50% purity and at a high surface-area-to-mass ratio. For example, a suitable preparation composed of magnesium would be a magnesium powder comparable to commercial grade magnesium powder.

The ball-milling step can be performed with any type of ball mill, such as a planetary ball mill, and with any type of ball-milling media, such as stainless steel beads. It will typically be preferable to perform the ball-milling step in an inert environment, such as in a glove box under vacuum or under argon.

Figure 1:
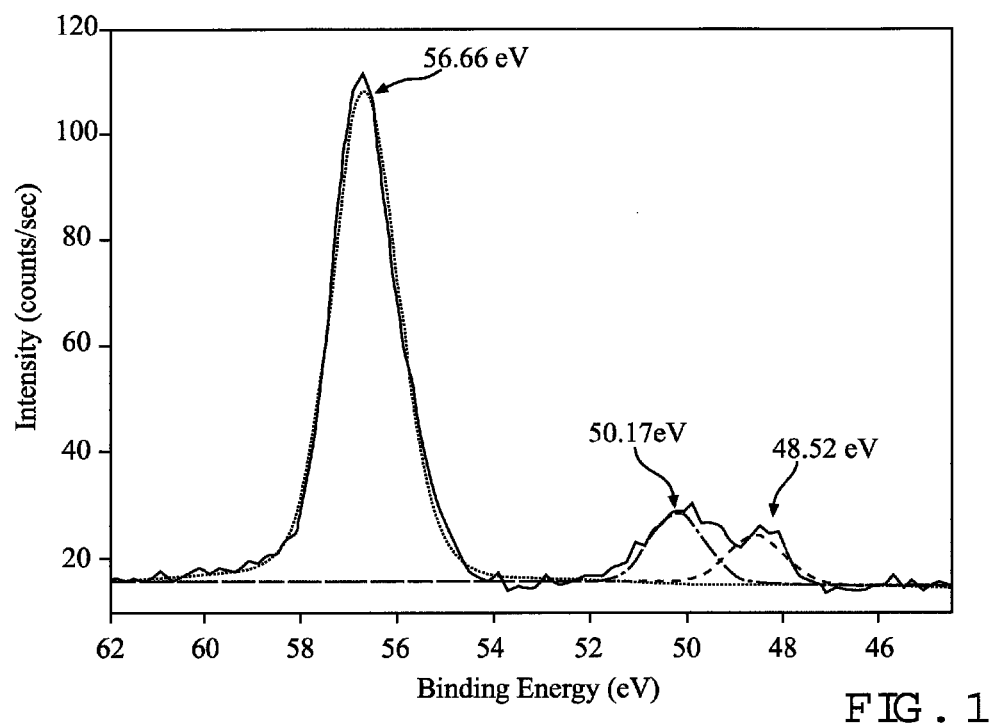
FIG. 1 is an x-ray photoelectron spectrum of an Mg.$(LiBH_4)_2$ complex prepared by the process reported here.

An x-ray photoelectron spectrum of a reagent Mg.(LiBH$_4$)$_2$ obtained by this process is shown in FIG. 1.

The reagent complex described above and by Formula I can be used in a method for synthesizing magnesium nanoparticles. The method for synthesizing magnesium nanoparticles includes the step of adding surfactant to a reagent complex according to Formula I, the reagent complex being in all particulars as described above. In some examples of the method for synthesizing magnesium nanoparticles, the reagent complex can be in suspended contact with a solvent or solvent system. Suitable solvents in which the reagent complex can be suspended during addition of surfactant will typically be solvents in which the suspended reagent complex is stable for at least an hour. In some examples, such suitable solvents can include ethereal solvents or aprotic solvents. In some particular examples, such a suitable solvent will be THF. In some instances, it may be preferred to perform the method for synthesizing magnesium nanoparticles in an inert environment, such as in a glove-box under vacuum or argon.

In some variations of the method for synthesizing magnesium nanoparticles, the surfactant can be in suspended or solvated contact with a solvent or solvent system. In different variations wherein the reagent complex is in suspended contact with a solvent or solvent system and the surfactant is suspended or dissolved in a solvent or solvent system, the reagent complex can be in suspended contact with a solvent or solvent system of the same or different composition as compared to the solvent or solvent system in which the surfactant is dissolved or suspended.

In some variations of the method for synthesizing magnesium nanoparticles, the reagent complex can be combined with surfactant in the absence of solvent. In some such cases a solvent or solvent system can be added subsequent to such combination. In other aspects, surfactant which is not suspended or dissolved in a solvent or solvent system can be added to a reagent complex which is in suspended contact with a solvent or solvent system. In yet other aspects, surfactant which is suspended or dissolved in a solvent or solvent system can be added to a reagent complex which is not in suspended contact with a solvent or solvent system.

The surfactant utilized in the method for synthesizing magnesium nanoparticles can be any known in the art. Usable surfactants can include nonionic, cationic, anionic, amphoteric, zwitterionic, and polymeric surfactants and combinations thereof. Such surfactants typically have a lipophilic moiety that is hydrocarbon based, organosilane based, or fluorocarbon based. Without implying limitation, examples of types of surfactants which can be suitable include alkyl sulfates and sulfonates, petroleum and lignin sulfonates, phosphate esters, sulfosuccinate esters, carboxylates, alcohols, ethoxylated alcohols and alkylphenols, fatty acid esters, ethoxylated acids, alkanolamides, ethoxylated amines, amine oxides, alkyl amines, nitriles, quaternary ammonium salts, carboxybetaines, sulfobetaines, or polymeric surfactants.

In some instances the surfactant employed in the method for synthesizing magnesium nanoparticles will be one capable of oxidizing, protonating, or otherwise covalently modifying the hydride incorporated in the reagent complex. In some variations the surfactant can be a carboxylate, nitrile, or amine. In some examples the surfactant can be octylamine.

Now disclosed is an electrode, suitable for use in an electrochemical cell. The electrode includes as electrochemically active material (or simply, as active material) magnesium nanoparticles. The magnesium nanoparticles included in the electrode have an average maximum dimension less than 100 nm. In some instances, the magnesium nanoparticles included in the electrode have an average maximum dimension of 10 nm or less. In some instances, the magnesium nanoparticles included in the electrode have an average maximum dimension of 5 nm or less. The magnesium nanoparticles included in the electrode are, in some variations, generally of uniform size and free of oxide. The magnesium nanoparticles included in the electrode can be obtained by the process for synthesizing magnesium nanoparticles, as disclosed above.

It will be appreciated that the disclosed electrode can, and frequently will, include additional structural and/or electrochemically active materials. For example, polytetrafluoroethylene (PTFE) can serve as a binder to facilitate magnesium nanoparticle dispersion, adhesion, or structural integrity. The disclosed electrode can include a substance such as carbon powder or carbon paper, to participate in electrochemistry or to serve as a structural substrate. It is to be understood that these are examples only, and that any suitable materials can be incorporated into the disclosed electrode along with the magnesium nanoparticles.

Thus, in one non-limiting example, discussed further below, an example electrode according to the present disclosure includes magnesium nanoparticles, obtained by the disclosed process for synthesizing magnesium nanoparticles. The magnesium nanoparticles are in suspended admixture with PTFE and carbon powder and the suspension is subsequently dried to produce the electrode.

Further disclosed is a magnesium electrochemical cell, within which occurs during normal operation at least the following electrochemical reaction:

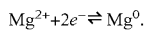

$$Mg^{2+}+2e^- \rightleftharpoons Mg^0.$$

It is to be understood that the above described electrochemical reaction represents at least a partial reaction, and that additional species can participate. As a defining feature, the disclosed magnesium electrochemical cell includes at least one electrode of the type described above which includes magnesium nanoparticles as active material.

The disclosed magnesium electrochemical cell additionally includes at least one electrolyte which includes or produces Mg$^{2+}$ ions. The electrolyte can be contained within a liquid solvent or a solid solvent-matrix. The liquid solvent or solid solvent-matrix can be any suitable to enable effective migration of the electrolyte. In some instances, an ethereal liquid solvent can be employed, such as THF, glyme, diglyme, tetraglyme, or various polyglyme solvents. It is to be understood, however, that these are presented for exemplary purposes only, and are not intended to limit the scope of the disclosed magnesium electrochemical cell.

While the disclosed magnesium electrochemical cell will typically have at least one additional electrode, such as an auxiliary electrode or a reference electrode, the structure and composition of the at least one additional electrode can be of any type. In a non-limiting example, presented for exemplary and testing purposes only, a magnesium electrochemical cell according to the present disclosure includes: a working electrode according to the present disclosure, having magnesium nanoparticles obtained by the method for synthesizing magnesium nanoparticles, a magnesium ribbon counter electrode, magnesium wire reference electrode, and borohydride electrolyte (Mg(BH$_4$)$_2$:LiBH$_4$ in monoglyme. A cyclic voltammogram for this exemplary electrochemical cell, shown in FIG. 2, indicates the working electrode is capable of reversible Mg deposition and stripping with negligible overpotential.

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

EXAMPLE 1

Magnesium Nanoparticle Synthesis 3.000 g of magnesium metal powder and 5.377 g of lithium borohydride are combined in a planetary ball mill. The combination is ball-milled at 160 rpm for 4 hours with stainless steel ball bearings. This produced particles of $Mg.(LiBH_4)_2$ complex having a no detectable magnesium oxide present and a maximum average dimension less the 50 nm. 2.501 mg of the $Mg.(LiBH_4)_2$ complex is combined with 100 mL THF and 47.57 g octylamine. This mixture is stirred for 4 hours. The solid product is collected and then washed multiple times with additional THF.

EXAMPLE 2

Magnesium Electrode Fabrication

Magnesium nanoparticles from Example 1 and carbon powder are co-suspended in glyme at a 7:2 (w/w) ratio. PTFE binder is added to 10% of the total solid weight to achieve a final weight percentage (by weight) of 70% magnesium, 20% carbon, and 10% PTFE. Solvent is allowed to evaporate while the suspension is stirred until the solvent is fully evaporated.

EXAMPLE 3

Microscopic and Electrochemical Testing of Magnesium Electrode

Figure 2:
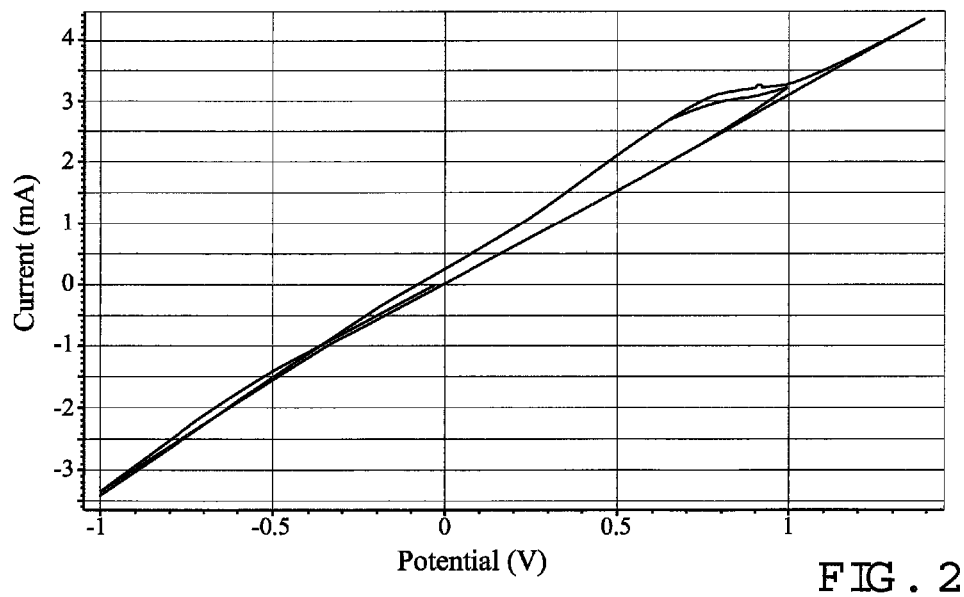
FIG. 2 is a magnesiation curve for a Mg-ion electrochemical cell having an electrode which includes as active material magnesium nanoparticles synthesized by the disclosed method.

Electron microscopy of an electrode according to Example 2 (data not shown) indicates that the magnesium nanoparticles are well dispersed in the electrode and have a highly homogeneous, average maximum dimension less than 5 nm. An electrode according to Example 2 is then incorporated, as working electrode, into a three electrode electrochemical cell having magnesium ribbon and magnesium wire as counter and reference electrode, respectively. Electrolyte is $Mg(BH_4)_2$:$LiBH_4$ in monoglyme. A voltammogram of the electrochemical cell is shown in FIG. 2.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An electrode comprising magnesium nanoparticles, the magnesium nanoparticles synthesized by a method comprising:
   adding surfactant to a reagent complex according to a formula:

$Mg^0.X_y$, wherein $Mg^0$ is zero-valent magnesium, X is a hydride, and y is an integral or fractional value greater than zero.

2. The electrode of claim 1 wherein the reagent complex is obtained by a process that includes a step of:
   ball milling a mixture that includes a hydride and a preparation composed of magnesium.

3. The electrode of claim 1 wherein the hydride is lithium borohydride.

4. The electrode of claim 1 wherein the magnesium nanoparticles have an average maximum dimension less than 100 nm.

5. The electrode of claim 1 wherein the magnesium nanoparticles have an average maximum dimension less than 10 nm.

6. The electrode of claim 1 wherein the magnesium nanoparticles have an average maximum dimension less than 5 nm.

7. An electrochemical cell having an electrode, the electrode comprising magnesium nanoparticles, the magnesium nanoparticles having been synthesized by a method comprising:
   adding surfactant to a reagent complex according to a formula:

$Mg^0.X_y$, wherein $Mg^0$ is zero-valent magnesium, X is a hydride, and y is an integral or fractional value greater than zero.

8. The electrochemical cell of claim 7 wherein the magnesium nanoparticles have an average maximum dimension less than about 10 nm.

9. The electrochemical cell of claim 7 wherein the magnesium nanoparticles have an average maximum dimension less than about 5 nm.

10. The electrochemical cell of claim 7 wherein the magnesium nanoparticles have an average maximum dimension of about 10 nm or less.

11. The electrochemical cell of claim 7 wherein the electrochemical cell is a Mg-ion electrochemical cell.

12. The electrochemical cell of claim 7 having an operative electrochemical reaction:

$Mg^{2+} + 2e^- \rightleftharpoons Mg$.

* * * * *